(12) United States Patent
Youn

(10) Patent No.: US 6,321,684 B1
(45) Date of Patent: Nov. 27, 2001

(54) AQUARIUM FOR MOUNTING ON A WALL

(76) Inventor: Ho Sun Youn, 500 S. St. Andrews Pl. #301, Los Angeles, CA (US) 90020

( * ) Notice: Subject to any disclaimer, the term of this patent is extended or adjusted under 35 U.S.C. 154(b) by 0 days.

(21) Appl. No.: 09/432,373

(22) Filed: Nov. 1, 1999

(51) Int. Cl.[7] .................................................. A01K 63/04
(52) U.S. Cl. ................................................................ 119/257
(58) Field of Search ..................................... 119/245, 253, 119/257, 269

(56) References Cited

U.S. PATENT DOCUMENTS

| | | | | |
|---|---|---|---|---|
| 475,404 | * | 5/1892 | Lochmann | 119/257 |
| 3,276,428 | * | 10/1966 | Burch | 119/257 |
| 4,136,638 | * | 1/1979 | Fedor | 119/257 |
| 5,435,270 | * | 7/1995 | Newman | 119/257 |
| 5,706,760 | * | 1/1998 | Chang | 119/257 |
| 5,878,694 | * | 3/1999 | Irwin | 119/257 |

FOREIGN PATENT DOCUMENTS

2642270 * 8/1990 (FR) ..................................... 119/257

* cited by examiner

*Primary Examiner*—Charles T. Jordan
*Assistant Examiner*—Elizabeth Shaw

(57) ABSTRACT

An aquarium for mounting on a wall comprising a water holding receptacle having a front panel, a bottom panel, a pair of side panels, and a back panel. One or more elongated rods are placed on the surface of the back panel. Two or more holes extend through the back panel below the top edge of the back panel. A longitudinal strip of panel covering less than one fourth of the surface of the front panel is mounted across the surface of the front panel extending immediately below a top edge of the front panel.

4 Claims, 2 Drawing Sheets

AQUARIUM FOR MOUNTING ON A WALL

BACKGROUND OF THE INVENTION

1. Field of the Invention

This invention relates to an aquarium, more particularly, this invention relates to an aquarium for mounting on a wall.

2. Description of the Prior Art

There are many different types of aquariums. Most aquariums are placed on shelves, stands, or table tops. The weight of the water within the aquarium requires that it be placed on a sturdy relatively strong surface depending on the size. There are aquariums in the prior art that are mounted on walls. These types are mostly mounted into a wall by creating an aperture of a size equal to the aquarium. None of the prior art discloses an aquarium having all the features of the present invention.

It is a primary objective of the present invention to provide an aquarium that can be easily mounted on a wall.

It is another objective of the present invention to provide an aquarium for mounting on a wall which is relatively inexpensive.

SUMMARY OF THE INVENTION

The present invention is an aquarium for mounting on a wall. The aquarium has a receptacle for holding water. The receptacle has a front panel, a bottom panel, a pair of side panels, and a back panel. Each panel is made of a translucent material. The back panel has a top edge which in the preferred embodiment extends beyond a top edge of the side panels. To prevent the surface of the back panel from making contact with the wall, one or more elongated rods are placed on the surface of the back panel. Two or more holes extend through the back panel below the top edge of the back panel. The aquarium is mounted on the wall using fastening devices which goes through the holes and into the wall. A longitudinal strip of panel covering less than one fourth of the surface of the front panel is mounted across the surface of the front panel extending immediately below a top edge of the front panel. The back panel can be increased to extend beyond the bottom panel so that two or more holes can be placed through the bottom panel above its bottom edge. Fastening devices can fit through the holes and into the wall to provide extra support.

DETAILED DESCRIPTION OF THE PREFERRED EMBODIMENT

Figure 1:
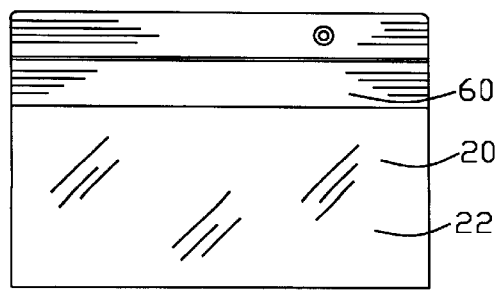
FIG. 1 is a front view of the aquarium.
Figure 2:
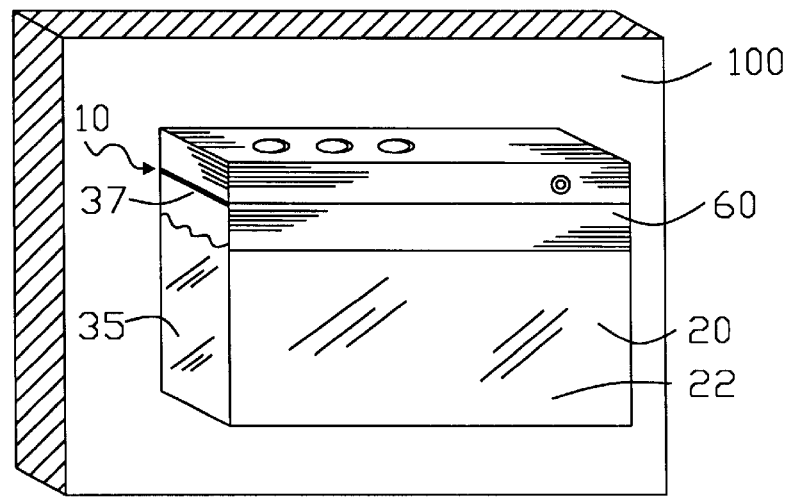
FIG. 2 is a front perspective view of the aquarium mounted on a wall.
Figure 3:
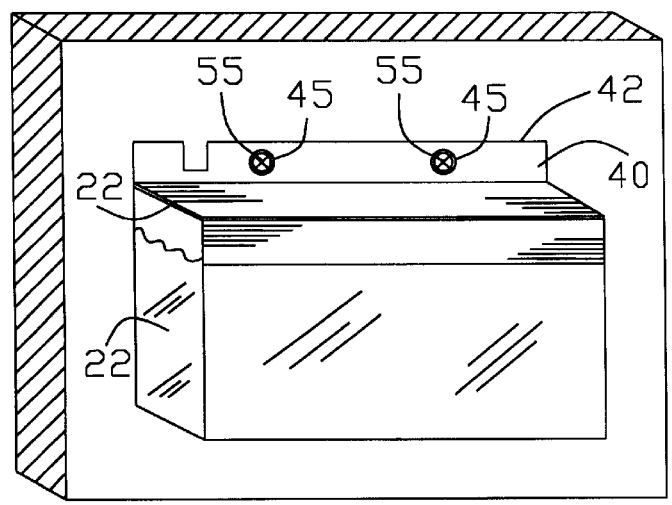
FIG. 3 is a front view of the aquarium mounted on a wall.
Figure 4:
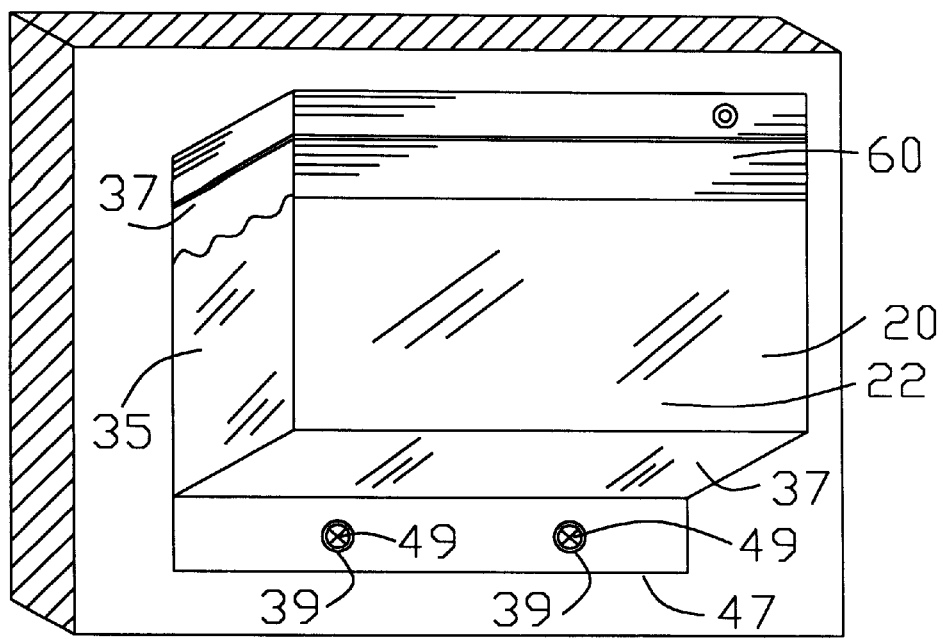
FIG. 4 is a side view of the aquarium mounted on a wall.
Figure 5:
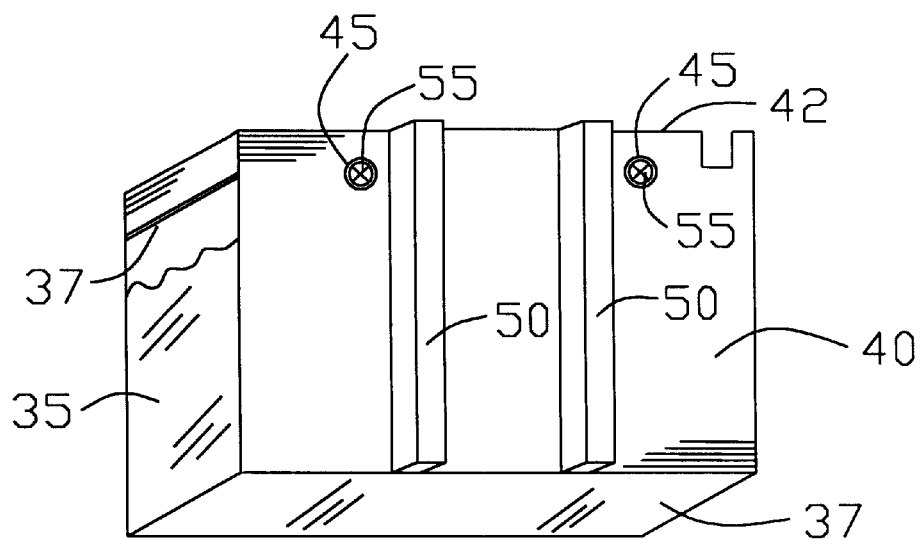
FIG. 5 is a back perspective view of the aquarium.

The present invention as shown in FIG. 1 is an aquarium 10 for mounting on a wall 100. The aquarium 10 has a water holding receptacle 20 made of a translucent material. The receptacle 20 has a front panel 22, a back panel 40, a pair of side panels 35, and a bottom panel 37. Each of the panels are joined together using an adhesive such as epoxy glue. Some glues have been known to have a slight solubility which can decrease the life of fishes in the aquarium. As such, a silicon based material is placed over all areas in which the panels join together. The back panel 40 has a top edge 42 which in the preferred embodiment extends beyond a top edge 37 of the side panels 35. To prevent the surface of the back panel 40 from making contact with the wall, one or more elongated rods 50 are placed on the surface of the back panel 40. Also, the rods 50 serve to create a space between the wall and the back panel 40 so that one or more electric cords could fit within the space without tilting the receptacle 20 against the wall. In the alternative, a plurality of protruding elements (not shown) can be placed on the back wall to create the same effect as the rods 50.

Two or more holes 45 extending through the back panel 40 are located below the top edge 42 of the back panel 40. The aquarium 10 is mounted on the wall using fasteners 55 which go through the holes 45 and into the wall.

A longitudinal strip of panel 60 is mounted across the surface of the front panel 22 extending immediately below a top edge 23 of the front panel 22. The strip of panel 60 covers less than one fourth of the surface of the front panel 22.

To ensure stable mounting on the wall, the length of the back panel 40 can be increased so that a bottom edge 47 of the back panel 40 extends beyond the bottom panel 37. Two or more holes 39 can be placed through the back panel 40 above the bottom edge 47. Fasteners 49 can fit through the holes 39 and into the wall.

What is claimed as being new and therefore desired to be protected by Letters Patent of the United States is as follows:

1. An aquarium for mounting on a wall comprising: a water holding receptacle made of a lightweight translucent material, said receptacle having a rectangular front panel, a bottom panel, a pair of side panels;

one or more elongated rods disposed on said surface of said back panel for preventing said back panel from touching said wall creating a gap of only ½ centimeter; and, two or more holes extending through said back wall comprising:

a longitudinal strip of panel disposed on said front panel extending immediately below a top edge of said front panel.

2. An aquarium as described in claim 1 further comprising:

a longitudinal strip of panel disposed on said front panel extending immediately below a top edge of said front panel.

3. An aquarium as described in claim 1 wherein a bottom edge of said back panel extends beyond said bottom panel and further comprising one or more holes extending through said back panel.

4. An aquarium as described in claim 1 wherein said front panel, said bottom panel, said pair of side panels, and said back panel are attached using an adhesive, said adhesive being covered by a silicon based material.

* * * * *